J. G. McCORMICK.
Tight and Loose Pulley.
No. 107,275.                                     Patented Sept. 13, 1870.
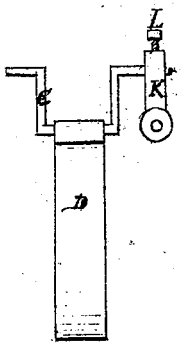
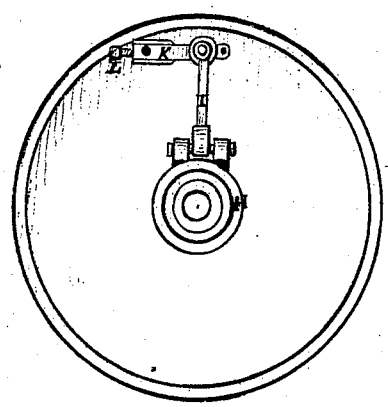
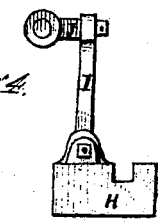
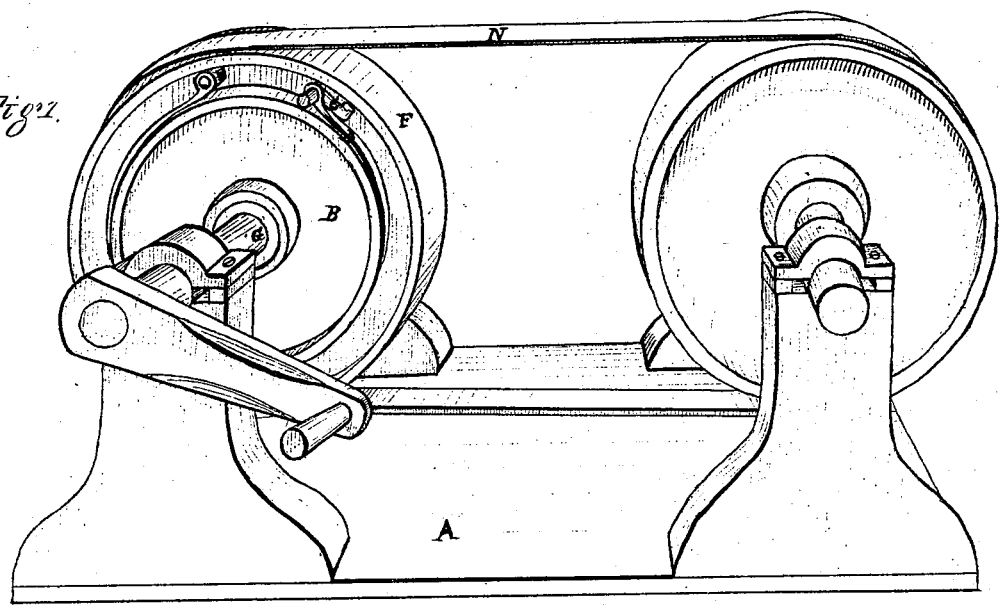
Witness:
E. P. Huyett
W. W. Pullen
Inventor:
John G. McCormick

United States Patent Office.

JOHN G. McCORMICK, OF LOUISVILLE, KENTUCKY.

Letters Patent No. 107,275, dated September 13, 1870.

IMPROVEMENT IN TIGHT AND LOOSE PULLEY.

The Schedule referred to in these Letters Patent and making part of the same

I, JOHN G. McCORMICK, of the city of Louisville, county of Jefferson and State of Kentucky, have invented a certain new and useful Improvement in a Combined Tight and Loose Pulley as a substitute for the old style of tight and loose pulleys as commonly used in band-gearing, of which the following is a specification.

This invention consists in substituting a single for a double pulley, or a friction rubber within a pulley, the former consisting of a small friction rubber keyed securely on the shaft and made much smaller in diameter than the outside pulley, with long hubs on either side to act as journals, on which the outside pulley revolves, the eyes of the hubs being bored out so as to fit the journals neatly, and may be lined with Babbitt or other suitable metal. This last-named pulley is made in two pieces, the rim or face being cast solid to one center or set of arms, while the other center set of arms is secured to the rim or face of the pulley by means of screw-bolts through a flange or lugs, against which it rests, leaving a sufficient space between the centers or arms for the friction rubber, against which they work closely, the hubs of the outside pulley being made long and bored out so as to fit the journals of the rubber neatly. This rubber is provided with a friction-band made of steel, iron, or any other suitable material, one end of which is secured to the side of the pulley by means of a bolt or pin, while the other is connected with a small crank in the inside of the pulley, the journal of this crank passing through to the outside of the pulley by which it is kept in its place, and on the outer end of this crank, immediately outside of the pulley, is another small crank secured to the end of it by means of a set-screw. The end of this last-named crank is made round, and acts as a journal for the connecting-eye to turn on, by which it is operated, which operation is accomplished by means of a sleeve made to slide loosely on the shaft.

On the side of this sleeve there is small lugs cast, to which a link is attached at one end, while the other is connected to the crank of the friction-band by means of a ball-shaped connection, through which the journal of the crank passes, while the other end passes through the upper end of the sleeve-link, forming a complete universal joint, operated by sliding the sleeve back and forth on the shaft, a groove being cut in the sleeve, and a forked lever fitted to it for that purpose.

The above-named pulley may be made either double or single, as the nature of the case may require it, and the whole improvement is intended to be used in either band or cog gearing, or as a brake for railroad-cars, or any similar purpose where friction is required.

Having thus fully described the nature of my invention, its construction and operation will be more fully explained by reference to the drawing.

Figure 1 is a perspective view of the machine complete, with one side of the pulley left open, in order to show the rubber and friction-band more clearly.

Figure 2 is a view of the back of the pulley, showing the device for operating the friction-band.

Figure 3 is a view of the friction-band and crank.

Figure 4 is a view of the connecting-link and sleeve.

A is the frame of the machine.

B is the rubber pulley.

D is the friction-band.

C is the crank by which it is operated.

E is the pin by which it is secured to the side of the pulley.

F is the pulley.

G is the shaft.

N is the band.

H is the sliding sleeve.

I is the link.

J is the connecting-pin.

K is the crank.

L is the set-screw.

I do not claim the friction-band as new in itself, as it has been long used; but

What I claim as new, and desire to secure by Letters Patent, is—

A substitute for the fast and loose pulleys in machinery, composed of the friction rubber B, keyed to the shaft, the pulley F, shaft G, friction-band D, collar H, arms I K, set-screw L, and double crank C, when the band D is attached at one end to the pulley F, and at the other to the crank C, and all the parts are constructed and arranged to operate as and for the purpose described.

JOHN G. McCORMICK.

Witnesses:
  E. F. HUYCK,
  W. W. PULLEN.